(12) United States Patent
Nanno et al.

(10) Patent No.: US 7,767,340 B2
(45) Date of Patent: Aug. 3, 2010

(54) NON-AQUEOUS ELECTROLYTE SECONDARY BATTERY AND METHOD OF PRODUCING COATING FOR NEGATIVE ELECTRODE ACTIVE MATERIAL THEREOF

(75) Inventors: Tetsuo Nanno, Yao (JP); Tomohiro Ueda, Kashiba (JP)

(73) Assignee: Panasonic Corporation, Osaka (JP)

( * ) Notice: Subject to any disclaimer, the term of this patent is extended or adjusted under 35 U.S.C. 154(b) by 1198 days.

(21) Appl. No.: 11/358,083

(22) Filed: Feb. 22, 2006

(65) Prior Publication Data

US 2006/0188778 A1      Aug. 24, 2006

(30) Foreign Application Priority Data

Feb. 22, 2005    (JP)    ............................. 2005-045031

(51) Int. Cl.
*H01M 4/58* (2010.01)
(52) U.S. Cl. .............................. 429/218.1; 429/231.95; 429/324; 429/137; 429/246; 429/199; 429/200; 427/58
(58) Field of Classification Search ............ 429/231.95, 429/218.1, 324, 137, 246, 199, 200; 427/58
See application file for complete search history.

(56) References Cited

U.S. PATENT DOCUMENTS 6,291,107 B1 *  9/2001  Shimizu ...................... 429/324
2004/0258996 A1 * 12/2004  Kim et al. ............. 429/231.95

FOREIGN PATENT DOCUMENTS

| JP | 09-035746 |   | 2/1997 |
|----|-----------|---|--------|
| JP | 11-97059  | * | 4/1999 |
| JP | 2001-015158 |  | 1/2001 |
| JP | 2003-031259 |  | 1/2003 |
| JP | 2003-151621 |  | 5/2003 |

* cited by examiner

*Primary Examiner*—Laura S Weiner
(74) *Attorney, Agent, or Firm*—McDermott Will & Emery LLP

(57) ABSTRACT

A non-aqueous electrolyte secondary battery having a positive electrode and a negative electrode with an active material capable of absorbing and desorbing lithium, a separator interposed between the positive and negative electrodes, and a non-aqueous electrolyte. The negative electrode active material is covered by a coating having elasticity. The fully elastic coating expands and contracts following the volume change of the negative electrode active material; thus, the coating brings out its desired functions without being damaged or broken. Regardless of the degree of the volume change of the negative electrode active material, a lasting coating without damage is formed on the negative electrode active material, to improve performances of the non-aqueous electrolyte secondary battery.

3 Claims, 2 Drawing Sheets

NON-AQUEOUS ELECTROLYTE SECONDARY BATTERY AND METHOD OF PRODUCING COATING FOR NEGATIVE ELECTRODE ACTIVE MATERIAL THEREOF

FIELD OF THE INVENTION

The present invention relates to a high-capacity non-aqueous electrolyte secondary battery. More particularly, the present invention relates to an improvement of a negative electrode for non-aqueous electrolyte secondary batteries in view of enhancing charge and discharge cycle characteristics and high-rate discharge characteristics.

BACKGROUND OF THE INVENTION

Currently, for non-aqueous electrolyte secondary batteries, many researches are conducted for lithium secondary batteries having high-voltage and high energy density. For the positive electrode active material in lithium secondary batteries, a lithium-containing transition metal oxide such as $LiCoO_2$, for example, is generally used, and for the negative electrode active material in lithium secondary batteries, carbon materials for example are generally used. Further, for the non-aqueous electrolyte used in non-aqueous electrolyte secondary batteries, a non-aqueous electrolyte obtained by dissolving a solute in a non-aqueous solvent is generally used. For the non-aqueous solvent, cyclic carbonate, acyclic carbonate, and cyclic carboxylate are used, for example, and for the solute, lithium hexafluorophosphate ($LiPF_6$) and lithium tetrafluoroborate ($LiBF_4$) are used, for example.

To improve battery characteristics, there have been attempts to mix various additives into the positive electrode active material, negative electrode active material, and electrolyte, respectively. For example, aiming for an improvement of charge and discharge cycle characteristics, Japanese Laid-Open Patent Publication No. 2003-151621 and Japanese Laid-Open Patent Publication No. 2003-031259 proposed to add vinylene carbonate (VC) or vinyl ethylene carbonate (VEC) into the electrolyte so that VC or VEC decomposes on the negative electrode to form a protective coating, to suppress a side reaction of the electrolyte and the negative electrode active material.

Aiming to improve cycle reliability and storage stability of lithium secondary batteries, Japanese Laid-Open Patent Publication No. Hei 09-035746 proposed to include an unsaturated cyclic hydrocarbon compound such as 1,5-cyclooctadiene in the electrolyte, so that 1,5-cyclooctadiene and the like and lithium ion in the form of solvates can be co-intercalated into layers of negative electrode carbon.

Further, aiming to suppress a decrease in thermal stability of positive electrode active material and to improve safety under over-charged state, Japanese Laid-Open Patent Publication No. 2001-015158 proposed to include 2,3-dimethyl-1,3-butadiene in the electrolyte so that 2,3-dimethyl-1,3-butadiene can be polymerized by electrolysis on the positive electrode while in over-charged state.

However, when a material system which undergoes a great volume change while charging and discharging, such as a material composed mainly of Si, Sn, or the like as an element for example, is used for the negative electrode active material, despite using any of the above-proposed prior art techniques, the coating formed on the surface of the negative electrode active material is damaged or broken. Thus, there was a problem in that the effect intended in the above patent publication documents cannot be obtained sufficiently.

The present invention is made to solve the conventional problems such as the above, and aims to improve various characteristics of non-aqueous electrolyte secondary batteries by forming a coating which durably exists on the surface of the negative electrode active material without being damaged or broken regardless of the degree of the volume change of the negative electrode active material.

BRIEF SUMMARY OF THE INVENTION

The present invention provides a non-aqueous electrolyte secondary battery comprising: a positive electrode having a positive electrode active material capable of absorbing and desorbing lithium; a negative electrode having a negative electrode active material capable of absorbing and desorbing lithium; a separator interposed between the positive electrode and the negative electrode; and a non-aqueous electrolyte; wherein the negative electrode active material is covered by a coating, which comprises a polymer of a compound represented by the general formula (1):

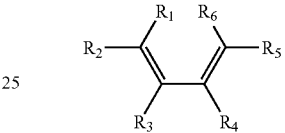

where each of $R_1$, $R_2$, $R_3$, $R_4$, $R_5$, and $R_6$ independently represents a hydrogen atom or an alkyl group having 1 to 5 carbon atoms, and at least one of $R_1$, $R_2$, $R_3$, $R_4$, $R_5$, and $R_6$ may include an atom having a lone pair.

The non-aqueous electrolyte secondary battery of the present invention mentioned above is characterized in that the coating mentioned above for covering the negative electrode active material has elasticity. The coating comprises a polymer of a compound represented by the above general formula (1). The compound includes 2 or more conjugated carbon-to-carbon unsaturated bonds.

Thus, "elasticity" mentioned in the present invention means flexibility and stretchability realized by the above coating when the above compound forming the coating noted above has 2 or more conjugated unsaturated carbon-to-carbon bonds.

In the present invention, the coating with "elasticity" covering the negative electrode active material flexibly changes its form according to the volume change of the negative electrode active material, even in the case where the negative electrode active material having at least one of Si and Sn and having a greater degree of volume change while charging and discharging is used, in addition to the case where the negative electrode active material comprising graphite is used. Thus, the coating enables avoiding damages and breakages, and suppressing reliably the side reaction of non-aqueous electrolyte and negative electrode active material, making it possible for the non-aqueous electrolyte secondary battery of the present invention to exhibit excellent charge and discharge cycle characteristics and high-rate discharge characteristics.

Therefore, the effects of the present invention are shown further remarkably when the negative electrode active material with a larger degree of volume change by charging and discharging is used, for example, the negative electrode active material mainly composed of a compound including at least one of Si and Sn as an element.

In the present invention, the compound is preferably isoprene, and the element having a lone pair is preferably a nitrogen atom or an oxygen atom.

Additionally, in the general formula (1), at least one of $R_1$, $R_2$, $R_3$, $R_4$, $R_5$, and $R_6$ is further preferably an alkoxy group, an alkoxyalkyl group, an aminoalkyl group, or a perfluoroalkoxy group.

Further, the non-aqueous electrolyte secondary battery of the present invention preferably includes 0.1 to 10 mol % of an organic halide relative to the compound represented by the general formula (1). The organic halide is represented by the general formula (2):

$X(CH_2)_nCH_3$, where n is an integer from 1 to 5, and X is Cl, Br, or I. The organic halide is preferably a primary aliphatic halide having 2 to 6 carbon atoms.

The organic halide may be included in the non-aqueous electrolyte secondary battery of the present invention so that the organic halide exists in the proximity of the negative electrode.

The present invention also relates to a method of forming a coating for a negative electrode active material of a non-aqueous electrolyte secondary battery comprising a positive electrode including a positive electrode active material capable of absorbing and desorbing lithium, a negative electrode including a negative electrode active material capable of absorbing and desorbing lithium, a separator interposed between the positive electrode and the negative electrode, and a non-aqueous electrolyte, the method comprising:

a first step for adding a compound represented by the general formula (1):

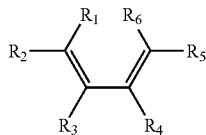

where each of $R_1$, $R_2$, $R_3$, $R_4$, $R_5$, and $R_6$ independently represents a hydrogen atom or an alkyl group having 1 to 5 carbons, and at least one of $R_1$, $R_2$, $R_3$, $R_4$, $R_5$, and $R_6$ may include an atom having a lone pair; and a second step for polymerizing the compound represented by the general formula (1) in the non-aqueous electrolyte secondary battery to form a coating for covering the negative electrode active material.

According to the method of forming a coating of the present invention, a coating with "elasticity" which covers the negative electrode active material and flexibly changes its shape according to the volume change of the negative electrode active material can be formed easily, and a non-aqueous electrolyte secondary battery with excellent charge and discharge cycle characteristics and high-rate discharge characteristics can be obtained further reliably, by further suppressing the side reaction of non-aqueous electrolyte and negative electrode active material, even when the negative electrode active material with a larger degree of volume change by charging and discharging is used.

In the first step, the compound represented by the general formula (1) is preferably added in the non-aqueous electrolyte secondary battery by dissolving the compound into the non-aqueous electrolyte.

In the first step, the amount of the compound represented by the general formula (1) to be dissolved in the non-aqueous electrolyte is preferably 0.1 to 10 wt % relative to the non-aqueous electrolyte.

Further, in the first step, 0.1 to 10 mol % of an organic halide relative to the compound is added preferably to the non-aqueous electrolyte secondary battery, the organic halide being represented by the general formula (2):

$X(CH_2)_nCH_3$, where n is an integer from 1 to 5, and X is Cl, Br, or I.

Although the formation of the coating can be confirmed by disassembling the non-aqueous electrolyte secondary battery, further simply, it can be confirmed by synthesizing the above polymer in a model experiment and then conducting an 1H NMR analysis for the obtained polymer. Specifically, it can be confirmed by obtaining the ratio between 1,2-polymer and 1,4-polymer and the ratio between cis polymer and trans polymer and then specifying the amount of 1,4-cis polymer, for example.

According to the present invention, even when the negative electrode active material with a larger degree of volume change by charging and discharging is used, a coating for covering the surface of the negative electrode active material can be formed stably, deterioration of the charge and discharge cycle characteristics of the non-aqueous electrolyte secondary battery due to the side reaction between the non-aqueous electrolyte and the negative electrode can be prevented effectively, and non-aqueous electrolyte secondary battery with excellent charge and discharge cycle characteristics and high-rate discharge characteristics can be provided more reliably.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

1. Non-aqueous Electrolyte Secondary Battery

Figure 1:
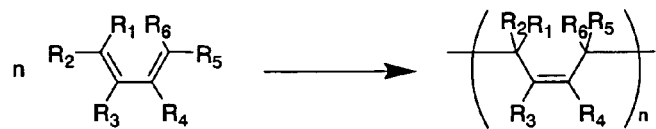
FIG. 1 shows a preferable polymerization reaction of a compound represented by the general formula (3).

A non-aqueous electrolyte secondary battery of the present invention comprises a positive electrode having a positive electrode active material capable of absorbing and desorbing lithium, a negative electrode having a negative electrode active material capable of absorbing and desorbing lithium, a separator interposed between the positive electrode and the negative electrode, and a non-aqueous electrolyte, wherein the negative electrode active material is covered by a coating formed of a polymer of the above compound.

In the following, each component of the non-aqueous electrolyte secondary battery of the present invention is described.

A positive electrode of the non-aqueous electrolyte secondary battery of the present invention includes at least a positive electrode active material capable of absorbing and desorbing lithium, a positive electrode binder, and a positive electrode current collector. A conductive agent is also included as necessary.

For the positive electrode active material, conventional materials used in non-aqueous electrolyte secondary batteries may be used, including, $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$ (M is at least one selected from Na, Mg, Sc, Y, Mn, Fe, Co, Ni, Cu, Zn, Al, Cr, Pb, Sb, and B; x=0 to 1.2; y=0 to 0.9; and z=2.0 to 2.3), for example. The value of x in the above is the value before starting charge and discharge, and the value changes while charging and discharging.

For the positive electrode binder, conventionally known ones can be used, including, polyethylene, polypropylene, polytetrafluoroethylene (PTFE), polyvinylidene fluoride (PVDF), tetrafluoroethylene-hexafluoropropylene copolymer (FEP), and vinylidene fluoride-hexafluoropropylene copolymer, for example.

For the positive electrode current collector, conventionally known ones can be used, including, a sheet and a foil made of stainless steel, aluminum, titanium, and the like can be used, for example. The thickness of the positive electrode current collector may be 1 to 500 μm, for example, although not particularly limited.

For the conductive agent to be included in the positive electrode as necessary, conventionally known ones can be used, including, graphite such as carbon blacks, acetylene black, Ketjen Black, channel black, furnace black, lamp black, and thermal black; carbon fiber; and metal fiber, for example.

On the other hand, a negative electrode of the non-aqueous electrolyte secondary battery of the present invention includes a negative electrode active material capable of absorbing and desorbing lithium, and a negative electrode current collector. A negative electrode binder and/or a conductive agent may be also included as necessary.

For the negative electrode active material of the present invention, conventionally used ones for non-aqueous electrolyte secondary batteries can be used, including, graphite such as natural graphite (flake graphite and the like) and artificial graphite; carbon blacks such as acetylene black, Ketjen Black, channel black, furnace black, lamp black, and thermal black; carbon fiber; and metal fiber, for example.

Particularly, the negative electrode active material including at least one of Si and Sn as an element (SiO, $SiO_x$, Si and/or an alloy of Sn and transition metal) is preferable, for its large theoretical capacity.

Although the negative electrode active material changes its volume greatly while charging and discharging, based on the "elasticity" of the coating, conventionally occurred side reactions of non-aqueous electrolyte and negative electrode can be also suppressed effectively. Therefore, the improvement effect of the present invention can be further preferably obtained when the negative electrode material including at least one of Si and Sn as an element is used.

For the negative electrode binder, the same binder as the one mentioned for the positive electrode binder can be used.

For the negative electrode current collector, conventionally known ones can be used, including, a sheet and a foil made of stainless steel, nickel, copper, and the like, for example. The thickness of the negative electrode current collector may be 1 to 500 μm, for example, although not particularly limited.

For the conductive agent to be included in the negative electrode, the same conductive agent to be included in the positive electrode as the one mentioned above can be used. The same material can be used for the negative electrode active material and the conductive agent.

For the non-aqueous electrolyte, a conventional one in which a solute is dissolved in a non-aqueous solvent can be used. For the non-aqueous solvent, cyclic carbonate, acyclic carbonate, cyclic carboxylate, and the like can be used, for example.

For the cyclic carbonate, propylene carbonate (PC) and ethylene carbonate (EC) can be mentioned, for example, and for the acyclic carbonate, diethyl carbonate (DEC), ethyl methyl carbonate (EMC), dimethyl carbonate (DMC), and the like can be mentioned, for example. For the cyclic carboxylate, γ-butyrolactone (GBL) and γ-valerolactone (GVL) can be mentioned, for example.

For the solute, conventional lithium salt may be used, including, $LiClO_4$, $LiBF_4$, $LiPF_6$, $LiAlClO_4$, $LiSbF_6$, LiSCN, $LiCF_3SO_3$, $LiCF_3CO_2$, $Li(CF_3SO_2)_2$, $LiAsF_6$, $LiB_{10}Cl_{10}$, lithium lower aliphatic carboxylate, LiCl, LiBr, LiI, chloroboran lithium, borate such as lithium bis[1,2-benzenediolato(2-)-O,O']borate, lithium bis[2,3-naphthalenediolato(2-)-O,O']borate, lithium bis[2,2'-biphenyldiolato(2-)-O,O']borate, lithium bis[5-fluoro-2-olate-1-benzenesulfonic-O, O']borate; imide salts such as lithium bis(trifluoromethanesulfonyl)imide (($CF_3SO_2)_2NLi$), lithium nonafluorobutanesulfonyl trifluoromethanesulfonyl imide ($LiN(CF_3SO_2)(C_4F_9SO_2)$), lithium bis(pentafluoroethysulfonyl)imide (($C_2F_5SO_2)_2NLi$), for example. These may be used alone, or may be used in combination.

For the separator, a conventional porous thin film having high ion permeability, predetermined mechanical strength, and nonconductivity (insulation) may be used, including a sheet composed of olefin polymer such as polypropylene or polyethylene or of glass fiber, nonwoven fabric, or fabric, for example. The thickness of the separator is generally 10 to 300 μm, although not limited particularly.

The coating for covering the surface of the negative electrode active material is formed of a polymer of a compound represented by the general formula (1). As mentioned in the above, the coating formed of this polymer has "elasticity", and has flexibility and stretchability sufficient to avoid damage (breakage) and separation from the surface of the negative electrode active material, regardless of the volume change in the above negative electrode active material while charging and discharging of the non-aqueous electrolyte secondary battery of the present invention.

In view of further reliably suppressing the side reaction of non-aqueous electrolyte and negative electrode active material, the above coating preferably covers the whole surface of negative electrode active material particles (at least one of primary particles and secondary particles). However, the effects of the present invention can be obtained also even with a partial coverage of the surface of the negative electrode active material particles. That is, even with the partial coverage by the coating on the negative electrode active material particles, in addition to the suppression of the side reaction of non-aqueous electrolyte and negative electrode active material, the above "elasticity" enables avoiding damage (breakage) of the coating and separation from the surface of the negative electrode active material, even with the volume change in the negative electrode active material.

The above coating may cover the whole surface or a part of an agglomeration formed of a plurality of negative electrode active material particles.

The above coating comprises the polymer of the compound represented by the general formula (1). The polymer may comprise a compound represented by the general formula (1) alone, or may comprise a copolymer formed of two or more compounds represented by the general formula (1). The coating may be formed of a plurality of polymers.

Therefore, the compound forming the polymer may be one kind of compound represented by the general formula (1), or may be formed of a mixture of two or more compounds represented by the general formula (1).

The above coating may comprise any one of cis polymer and trans polymer, or may comprise both.

Particularly, in view of realizing a coating further excellent in flexibility, the coating preferably comprise cis polymer. In the case where the coating comprises both cis polymer and trans polymer, the amount of cis polymer preferably exceeds the amount of trans polymer.

For concrete examples of the compound represented by the general formula (1), a first compound and a second compound in the following may be mentioned.

The first compound is a compound having two or more conjugated carbon-to-carbon unsaturated bonds, and is represented by the general formula (3):

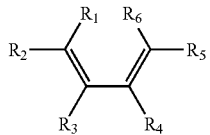

where each of $R_1$, $R_2$, $R_3$, $R_4$, $R_5$, and $R_6$ independently represents a hydrogen atom or an alkyl group having 1 to 5 carbons.

Each of substituents $R_1$ to $R_6$ may independently be a hydrogen atom, a methyl group, an ethyl group, a propyl group, a butyl group, or a pentyl group.

For the above first compound, 1,3-butadiene, isoprene, 2,3-dimethyl-1,4-butadiene, 2-methyl-1,3-pentadiene, 2-ethyl-1,3-pentadiene, 2-methyl-1,3-hexadiene, 2-ethyl-1,3-hexadiene, 2-methyl-1,3-heptadiene, 2-ethyl-1,3-heptadiene, 2-methyl-(2E,4E)-pentadiene, 2-methyl-(2E,4E)-hexadiene, and 2-methyl-(2E,4E)-heptadiene can be mentioned, for example.

However, when $R_2$ and $R_3$ are bulky substituents, the carbon-to-carbon double bond in the polymer of the first compound is prone to be located to form a trans structure relative to the polymer chain. Thus, in view of further reliably forming the coating showing "elasticity", to reliably form a polymer having the cis structure, $R_2$ and $R_3$ are preferably non-bulky substituents.

Also in view of further reliably forming the polymer with cis structure, at least one of $R_3$, and $R_4$ is preferably a hydrogen atom.

From the above, the first compound is preferably isoprene.

On the other hand, the second compound forming the above polymer has two or more conjugated carbon-to-carbon unsaturated bonds and an element having a lone pair, and is represented by the general formula (4):

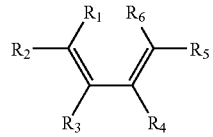

where each of $R_1$, $R_2$, $R_3$, $R_4$, $R_5$, and $R_6$ is independently a hydrogen atom or an alkyl group having 1 to 5 carbons, and at least one of $R_1$, $R_2$, $R_3$, $R_4$, $R_5$, and $R_6$ may include an atom having a lone pair. Each of the substituents $R_1$ to $R_6$ may independently be a hydrogen atom, a methyl group, an ethyl group, a propyl group, a butyl group, or a pentyl group, and the atom having a lone pair is preferably selected from a nitrogen atom and an oxygen atom.

At least one of $R_1$, $R_2$, $R_3$, $R_4$, $R_5$, and $R_6$ in the general formula (4) is further preferably an alkoxy group, an alkoxyalkyl group, an aminoalkyl group, or a perfluoroalkoxy group.

For the alkoxy group in the general formula (4)(i.e., general formula (1)), a methoxy group, an ethoxy group, a propoxy group, a butoxy group, or a pentoxy group may be selected. For the alkoxyalkyl group, a methoxymethyl group, a 2-methoxy-1-ethyl group, a 3-methoxy-1-propyl group, or a 2-(2-ethoxy)-1-ethyl group may be selected, for example. For the aminoalkyl group, a dimethylaminomethyl group, a 2-dimethylamino-1-ethyl group, a 3-dimethylamino-1-propyl group, or a diethylaminomethyl group may be selected. For the perfluoroalkoxy group, a trifluoromethoxy group may be selected, for example.

The coating formed of the polymer obtained by using the second compound has a C—O—C bond or a C—N—(—C)—C bond, and a lone pair of electrons in the oxygen atom or the nitrogen atom in the bond forms a coordinate bond with lithium ion in the non-aqueous electrolyte. Thus, higher lithium ion conductivity can be obtained. Therefore, the negative electrode active material covered by the coating formed of the polymer including the second compound is excellent in charge and discharge cycle characteristics, as well as high-rate discharge characteristics.

For the second compound, 1-methoxy-1,3-butadiene, 1-ethoxy-1,3-butadiene, 1-methoxy-3-methyl-1,3-butadiene, 1-methoxy-2,4-pentadiene, 2-(methoxymethyl)-1,3-butadiene, 1-(dimethylamino)-2,4-pentadiene, 1-(trifluoromethoxy)-1,3-butadiene, 2-(trifluoromethoxy)-1,3-butadiene can be mentioned, for example.

However, when $R_3$ and $R_4$ are bulky substituents, as in the first compound, the carbon-to-carbon double bond in the polymer of the second compound is prone to be located to form a trans structure relative to the polymer chain. Thus, in view of further reliably forming the coating showing "elasticity", to reliably form a polymer having the cis structure, $R_3$ and $R_4$ are preferably non-bulky substituents.

Also in view of further reliably forming the polymer with cis structure, at least one of $R_3$ and $R_4$ is preferably a hydrogen atom.

2. Method of Forming the Coating for the Negative Electrode Active Material of Non-Aqueous Electrolyte Secondary Battery A method of forming a coating for the negative electrode active material of the non-aqueous electrolyte secondary battery of the present invention (in other words, a method of producing a non-aqueous electrolyte secondary battery of the present invention) is described in the following.

Although a non-aqueous electrolyte secondary battery of the present invention can be produced by a known method, the above compound needs to be added in the non-aqueous electrolyte secondary battery. That is, to obtain a non-aqueous electrolyte secondary battery of the present invention having a coating for covering the surface of the negative electrode active material, a first step and a second step have to be carried out. In the first step, the compound represented by the general formula (1) is added in the non-aqueous electrolyte secondary battery, and in the second step, the compound is polymerized in the non-aqueous electrolyte secondary battery to form the coating for covering the negative electrode active material.

In the first step, the compound represented by the general formula (1) may be included in the non-aqueous electrolyte secondary battery. For example, the compound may be included in a positive electrode, a negative electrode, a separator, and a non-aqueous electrolyte. Particularly, in view of productivity of non-aqueous electrolyte secondary battery, the compound is added into the non-aqueous electrolyte before being injected into the non-aqueous electrolyte secondary battery, and then the non-aqueous electrolyte with the compound added is injected into the non-aqueous electrolyte secondary battery, preferably.

At this time, the amount of the compound represented by the general formula (1) to be added is preferably 0.1 to 10 wt % relative to the non-aqueous electrolyte. When the amount to be added is 0.1 wt % or more, the coating can be further reliably formed to obtain further reliably the effects of the present invention, and when the amount to be added is 10 wt % or less, the battery characteristics can be maintained further appropriately.

Then the second step is carried out by polymerizing the compound represented by the general formula (1) in the non-aqueous electrolyte secondary battery to form the coating for covering the negative electrode active material. To be more specific, the non-aqueous electrolyte secondary battery is charged and discharged to cause charge and discharge reaction in the negative electrode, to form the coating by polymerizing the compound in the vicinity of the negative electrode surface.

Figure 2:
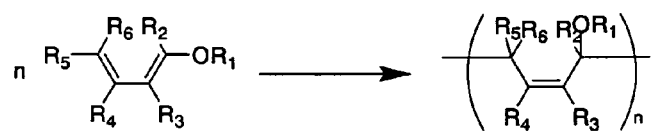
FIG. 2 shows a preferable polymerization reaction of a compound represented by the general formula (4).

FIG. 1 and FIG. 2 show preferable embodiments of the polymerization reactions of the first compound (the compound represented by the general formula (3)) and the second compound (the compound represented by the general formula (4)) included in the compound represented by the general formula (1), respectively. As shown in FIG. 1 and FIG. 2, a double bond newly-generated by a polymerization reaction is located to form a cis structure with relative to the polymer chain, and the crystallinity of the polymer declines to decrease a glass transition temperature, which enables obtaining the coating showing the "elasticity" under a wider temperature range.

For generating such geometrical isomer, i.e., cis structure, by priority, in addition to the method in which the kind (structure) of the first compound and the second compound are suitably selected, the method in which alkyl lithium is used as a polymerization initiator may be mentioned, for example.

In the present invention, the coating showing "elasticity" under a wider temperature range is formed on the surface of the negative electrode active material by, preferably, in the first step, adding an organic halide represented by the general formula (2):

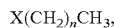

$X(CH_2)_nCH_3$, where n is an integer from 1 to 5, and X is Cl, Br, or I, into the non-aqueous electrolyte secondary battery, generating an alkyl lithium compound by halogen-lithium exchange in the proximity of the negative electrode surface, and by using the obtained compound to cause the polymerization reaction as shown in FIG. 1 or FIG. 2.

The amount of the organic halide to be added may be such an amount that can exhibit catalytic function. To be more specific, the amount of the organic halide to be added is preferably 0.1 to 10 mol % relative to the compound represented by the general formula (1). When the amount to be added is 0.1 mol % or more, a further reliable polymerization of the compound represented by the general formula (1) is made possible, and when the amount is 10 mol % or less, the deterioration of the non-aqueous electrolyte can be further reliably suppressed.

The organic halide represented by the general formula (2) is a primary aliphatic halide having 2 to 6 carbon atoms. When the number of carbon atom is 2 or more, an excessively low boiling point can be avoided, and when the number of carbon atom is 6 or less, an excessively slow exchange reaction of halogen-lithium can be avoided, achieving easier handling. Since secondary or tertiary aliphatic halide very easily reacts with a lithium compound, the side reaction with non-aqueous electrolyte may be caused to deteriorate battery characteristics.

Although a non-aqueous electrolyte secondary battery of the present invention, and a method of forming a coating for the negative electrode active material of the non-aqueous electrolyte secondary battery of the present invention are described in the above, other various design changes are possible in the present invention.

For example, the non-aqueous electrolyte may further include a benzene derivative, a conventional, well-known material which is decomposed under an overcharged state to form a coating on the electrode and to make the battery inactive.

The benzene derivative preferably includes a phenyl group and a cyclic compound group neighboring the phenyl group. For the cyclic compound group, a phenyl group, a cyclic ether group, a cyclic ester group, a cycloalkyl group, and a phenoxy group are preferable, for example.

Specific examples of the benzene derivative include cyclohexylbenzene, and biphenyl and diphenyl ether, for example. These benzene derivatives may be used alone, or may be used in combination. However, the benzene derivative content is preferably 10 wt % or less relative to the non-aqueous solvent.

The present invention is described in further details in the following by referring to Examples. However, the present invention is not limited to these Examples.

Example 1

(i) Preparation of Non-Aqueous Electrolyte $LiPF_6$ with a concentration of 1.0 mol/L was dissolved in a solvent mixture of EC and EMC (volume ratio 1:4) to obtain a non-aqueous electrolyte. To the obtained non-aqueous electrolyte, as a first compound of a compound represented by the general formula (1) (a compound represented by the general formula (3)), 2 wt % of 1,3-butadiene or isoprene was added.

(ii) Preparation of Positive Electrode Plate

To 85 parts by weight of lithium cobaltate powder, 10 parts by weight of acetylene black as a conductive agent, and 5 parts by weight of PVDF resin as a binder were mixed. The mixture was dispersed in dehydrated N-methyl-2-pyrrolidone (hereinafter referred to as NMP) to prepare a positive electrode material mixture slurry. The positive electrode material mixture slurry was applied on a positive electrode current collector made of aluminum foil, dried, and rolled to obtain a positive electrode plate.

(iii) Preparation of Negative Electrode Plate

To 75 parts by weight of an amorphous silicon oxide powder ($SiO_x$; x=1.02), 20 parts by weight of acetylene black as a conductive agent, and 5 parts by weight of PVDF resin as a binder were mixed. The mixture was dispersed in dehydrated NMP to prepare a negative electrode material mixture slurry. The negative electrode material mixture slurry was applied on a negative electrode current collector made of copper foil, dried, and rolled to obtain a negative electrode plate.

(iv) Preparation of Cylindrical Battery

Figure 3:
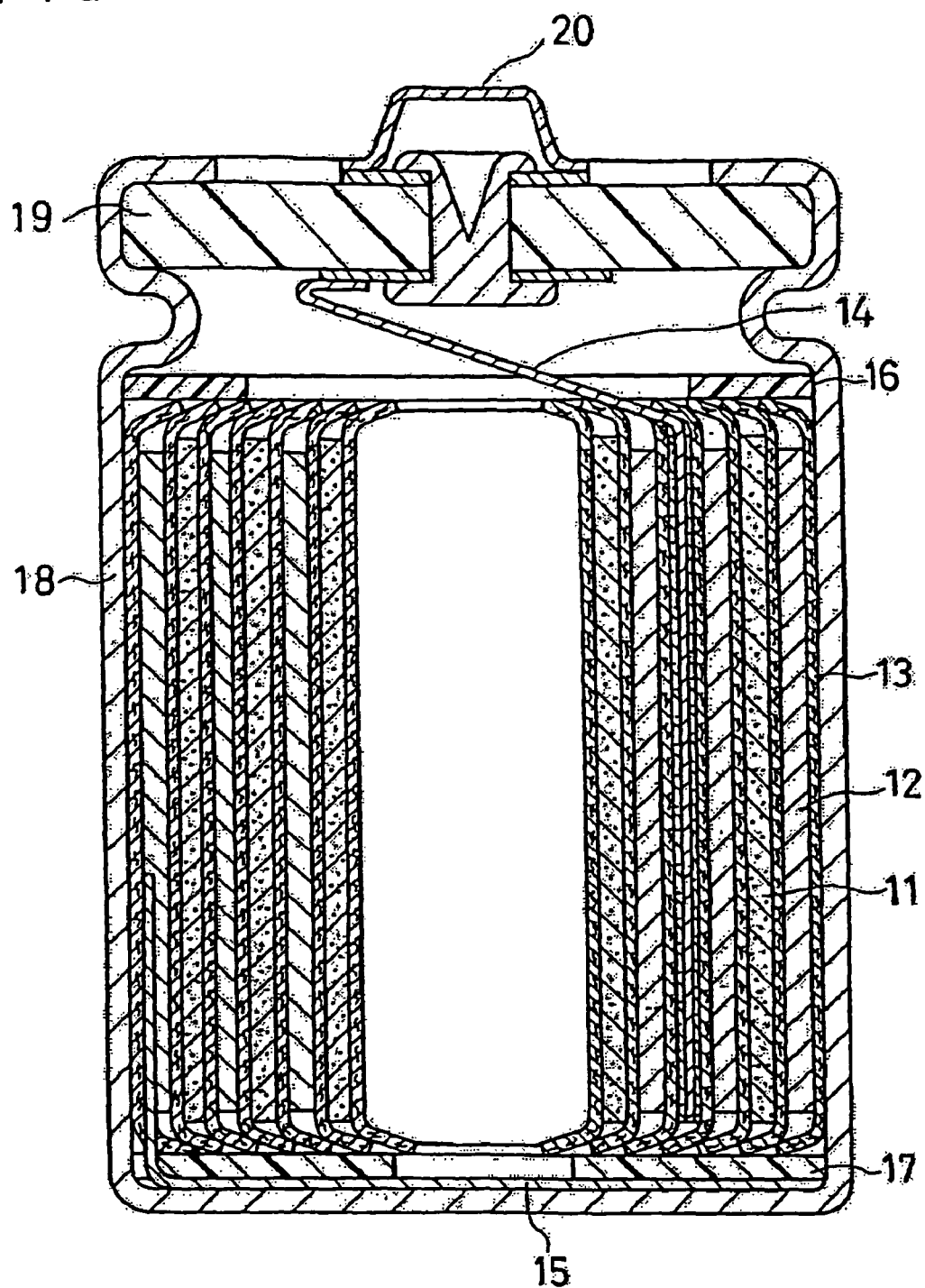
FIG. 3 shows a cross sectional view of a cylindrical battery as an embodiment of the non-aqueous electrolyte secondary battery of the present invention.

Using thus obtained non-aqueous electrolyte, positive electrode plate, and negative electrode plate, a cylindrical battery having a structure shown in FIG. 3 was made. FIG. 3 is a schematic vertical cross sectional view showing a structure of a cylindrical battery made in this Example.

A positive electrode plate 11 and a negative electrode plate 12 were wound like a swirl with a separator 13 made of polyethylene interposed therebetween, to prepare an electrode plate assembly. The obtained electrode plate assembly was housed in a battery case 18 made of iron with a nickel plating.

To the positive electrode plate 11, a positive electrode lead 14 made of aluminum was attached, and connected to the rear side of a sealing plate 19 being electrically connected to a positive electrode terminal 20. To the negative electrode plate 12, a negative electrode lead 15 made of nickel was attached, and connected to the bottom of the battery case 18.

An insulating plate 16 was provided at the top of the electrode plate assembly, and an insulating plate 17 was provided at the bottom of the electrode plate assembly, respectively.

Then, the non-aqueous electrolyte was injected into the battery case 18. The opening of the battery case 18 was sealed by using the sealing plate 19, thereby making a cylindrical battery with a structure shown in FIG. 3 (theoretical capacity 2300 mAh).

Afterwards, first charge and discharge were carried out to polymerize the compound to form a coating for covering the surface of the negative electrode active material, thereby obtaining a non-aqueous electrolyte secondary battery of the present invention.

Comparative Example 1

A non-aqueous electrolyte secondary battery was made in the same manner as Example 1, except that the compound was not added into the non-aqueous electrolyte.

Comparative Examples 2 to 4

A non-aqueous electrolyte secondary battery was made in the same manner as Example 1, except that vinylene carbonate (VC), vinyl ethylene carbonate (VEC), or 1,5-cyclooctadiene was added in the non-aqueous electrolyte instead of the above compound.

[Evaluative Test]

The following evaluative tests were carried out for the non-aqueous electrolyte secondary batteries made in Example 1 and Comparative Examples 1 to 4. Results are shown in Table 1.

(1) Capacity Retention Rate After Cycles

A cycle of charge and discharge was repeated under an atmosphere of 45° C. The capacity retention rate after cycles was evaluated by calculating the capacity retention rate of the battery completed 200 cycles, setting the discharge capacity of the battery at the 3rd cycle to 100%. For the charge and discharge, after a constant current and constant voltage charge of 2 and half hours was carried out at a maximum current of 1050 mA and an upper-limit voltage of 4.2 V, a constant current discharge was carried out with a discharge current of 1500 mA and a discharge end voltage of 3.0 V.

(2) High-Rate Discharge Characteristics

After charging with a constant current and a constant voltage for 2 and half hours at a maximum current of 1050 mA and an upper-limit voltage of 4.2 V under an atmosphere of 20° C., a constant current discharge was carried out with a discharge current of 150 mA or 3000 mA and the discharge end voltage of 3.0 V. The ratio between the discharge capacity at a discharge current of 150 mA and the discharge capacity at a discharge current of 3000 mA was calculated, and regarded as the high-rate discharge characteristics.

TABLE 1

| | | Results of Evaluative Test | |
|---|---|---|---|
| | Added Compound | Capacity Retention Rate (%) | High-Rate Discharge Characteristics (%) |
| Example 1 | 1,3-butadiene | 75 | 80 |
| Example 2 | isoprene | 80 | 79 |
| Comparative Example 1 | — | 23 | 81 |
| Comparative Example 2 | vinylene carbonate | 35 | 71 |
| Comparative Example 3 | vinyl ethylene carbonate | 38 | 69 |
| Comparative Example 4 | 1,5-cyclooctadiene | 27 | 68 |

Table 1 shows that in the non-aqueous electrolyte secondary batteries of the present invention in Examples 1 and 2, the capacity retention rate after 200 cycles is greatly improved, compared with the non-aqueous electrolyte secondary batteries of Comparative Examples 1 to 4. Reasons for the improvement in the Examples are probably as follows: the coating with "elasticity" was formed on the surface of the negative electrode active material; the coating flexibly expanded to follow the volume change of the active material due to the charge and discharge; and the coating suppressed the side reaction of the non-aqueous electrolyte and the negative electrode active material without damage.

On the other hand, in Comparative Example 1 without the compound, the capacity decrease is greater due to the side reaction of non-aqueous electrolyte and negative electrode active material. In Comparative Examples 2 to 4 in which VC, VEC, and 1,5-cyclooctadiene were added respectively as an additive for forming the coating on the negative electrode active material, a slight improvement is shown compared with Comparative Example 1. However, Comparative Examples 2 to 4 also show a large decrease in capacity by the charge and discharge cycles, probably because of the following: since the negative electrode active material mainly composed of Si caused a greater volume change of the active material while charging and discharging, the coating formed on the negative electrode active material was separated from the active material through the charge and discharge cycle, and the effects of the coating were not brought out.

Additionally, the decrease in the high-rate discharge characteristics is obvious in any of Comparative Examples 1 to 4, compared with Examples 1 and 2, in which the high-rate discharge characteristics of approximately 80% were obtained. The surface of the negative electrode active material in Comparative Example 1 was probably covered with $Li_2CO_3$, LiF, LiOR, and the like, which were a decomposition product of the non-aqueous electrolyte and the solute. The high-rate discharge characteristics declined probably because these coverings were low in lithium ion conductivity, compared with the coating of the present invention. The decline in the high-rate discharge characteristics in Comparative Examples 2 to 4 is probably due to the following: the coating formed on the surface of the negative electrode active material by each additive was damaged by the volume change of the active material through charge and discharge, and allowed the side reaction at the surface of the negative electrode active material.

Further, the results of Table 1 show that the battery performance is excellently balanced when isoprene was selected as the compound represented by the general formula (1).

Examples 3 to 8

A non-aqueous electrolyte secondary battery was made in the same manner as Example 1, except that isoprene was added as the compound in the non-aqueous electrolyte, and the added amount was set to the amounts shown in Table 2.

Herein, only the capacity retention rate after cycles was evaluated, from among the above evaluative tests. Results are shown in Table 2.

TABLE 2

|  | Amount of Isoprene Added (wt %) | Capacity Retention Rate (%) |
|---|---|---|
| Example 3 | 0.1 | 69 |
| Example 4 | 1 | 76 |
| Example 5 | 5 | 78 |
| Example 6 | 10 | 74 |
| Example 7 | 0.05 | 42 |
| Example 8 | 15 | 51 |

Table 2 shows that the appropriate amount of the compound to be added is 0.1 to 10 wt % relative to the non-aqueous electrolyte.

Examples 9 to 15

A non-aqueous electrolyte secondary battery was made in the same manner as Example 1, except that isoprene was added as the compound in the non-aqueous electrolyte, and further, 5 mol % of the organic halide shown in Table 3 (the compound represented by general formula (2)) relative to isoprene was added.

Herein, only the capacity retention rate after cycles was evaluated, from among the above evaluative tests. Results are shown in Table 3.

TABLE 3

|  | Organic Halide | Capacity Retention Rate (%) |
|---|---|---|
| Example 9 | bromoethane | 89 |
| Example 10 | 1-bromopropane | 88 |
| Example 11 | 1-chlorobutane | 93 |
| Example 12 | 1-bromohexane | 86 |
| Example 13 | 1-bromo-1,1-dimethylethane | 65 |
| Example 14 | 1-chlorodecane | 66 |
| Example 15 | bromobenzene | 63 |

Figure 4:
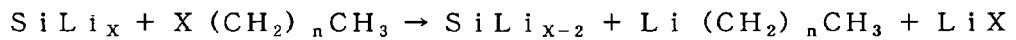
FIG. 4 shows a reaction in which a compound represented by the general formula (2) converts into an alkyl lithium compound.
Figure 5:
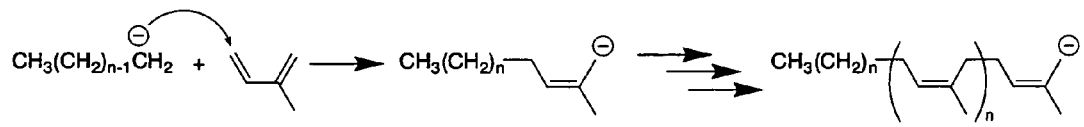
FIG. 5 shows a reaction in which a compound represented by the general formula (3) is polymerized with an alkyl lithium compound.

FIG. 4 shows a reaction in which an organic halide (the compound represented by the general formula (2)) converts into an alkyl lithium compound. FIG. 5 shows a reaction in which the compound represented by the general formula (1) is polymerized with an alkyl lithium compound.

Table 3 shows that the capacity retention rate after 200 cycles improved in the system to which the organic halide was added, compared with that of Examples 1 and 2 without the addition of the organic halide. The reasons are probably due to the following: when the negative electrode was charged, the added organic halide was converted into the alkyl lithium compound (ref. FIG. 4), and further, the compound became an polymerization initiator, to polymerize isoprene (ref. FIG. 5); as a result, the ratio of geometrical isomer of cis structure relative to polymer chain was increased, and the "elasticity" of the coating for the negative electrode active material was improved; and the coating worked effectively without being affected by the volume change of the negative electrode active material through charge and discharge cycle.

Among the batteries in Examples, when 1-bromo-1,1-dimethylethane was used, the battery performance was slightly deteriorated, probably because of unstable and fully reactive tert-butyl lithium generated by halogen-lithium exchange and of decomposition of electrolyte caused by the tert-butyl lithium.

When 1-chlorodecane having 10 carbon atoms was used, since the substituent has long chain, nucleophilicity of generated decyl lithium was decreased to prevent the polymerization reaction shown in FIG. 5 to sufficiently advance. When bromobenzene was used, nucleophilicity of phenyl lithium, which is considered to be generated, was weak and the polymerization reaction shown in FIG. 5 was prevented from advancing sufficiently.

Examples 16 to 20

A non-aqueous electrolyte secondary battery was made in the same manner as Example 1, except that in the non-aqueous electrolyte, isoprene was added as the above compound, and further, as an organic halide (a compound represented by general formula (2)), 1-chlorobutane was added in the amount shown in Table 4 (0.05 to 15 mol %) relative to isoprene.

Herein, only the capacity retention rate after cycles was evaluated, from among the above evaluative tests. Results are shown in Table 4.

TABLE 4

|  | Amount of 1-chlorobutane Added (mol %) | Capacity Retention Rate (%) |
| --- | --- | --- |
| Example 16 | 0.1 | 83 |
| Example 17 | 1 | 92 |
| Example 18 | 10 | 87 |
| Example 19 | 0.05 | 80 |
| Example 20 | 15 | 77 |

Table 4 shows that when the amount of 1-chlorobutane added was 0.05 mol %, there is no significant difference compared with the case of Table 1 with no addition, and that when the amount added was 15 mol %, battery characteristics were slightly deteriorated. The above results show that the appropriate amount of the organic halide to be added is 0.1 to 10 mol % relative to the compound represented by the general formula (1).

Examples 21 to 23

A non-aqueous electrolyte secondary battery was made in the same manner as Example 1, except that in the non-aqueous electrolyte, for the compound, 1-(trifluoroethoxy)-1,3-butadiene, 2-(trifluoromethoxy)-1,3-butadiene, or 1-methoxy-3-methyl-1,3-butadiene was added as a second compound (the compound represented by the general formula (4)). The above evaluative test was carried out in the same manner as Example 1. Results are shown in Table 5.

TABLE 5

|  |  | Results of Evaluative Test | |
| --- | --- | --- | --- |
|  | Added Compound | Capacity Retention Rate (%) | High-Rate Discharge Performance (%) |
| Example 21 | 1-(trifluoromethoxy)-1,3-butadiene | 73 | 87 |
| Example 22 | 2-(trifluoromethoxy)-1,3-butadiene | 76 | 84 |
| Example 23 | 1-methoxy-3-methyl-1,3-butadiene | 63 | 85 |

Table 5 shows that in the batteries of Examples 21 to 23, the capacity retention rate after 200 cycles is almost the same level with that of Examples 1 and 2. Additionally, in the batteries of Examples 21 to 23, the high-rate discharge characteristics of approximately 85% was obtained with the usage of any of the compound, showing more improvement in characteristics than the batteries of Examples 1 and 2.

One of the reasons is probably that the coating formed of the polymer obtained from the compound of Examples 21 to 23 had a higher lithium ion conductivity compared with the batteries in Examples 1 and 2, and therefore the high-rate discharge characteristics were improved. Table 5 also shows that the battery performance is excellently balanced when 2-(trifluoromethoxy)-1,3-butadiene was selected from among the compound represented by the general formula (4).

Examples 24 to 29

A non-aqueous electrolyte secondary battery was made in the same manner as Example 1, except that in the non-aqueous electrolyte, 1-(trifluoromethoxy)-1,3-butadiene was added in the amount shown in Table 6 (0.05 to 15 wt %) as the above compound.

Herein, only the capacity retention rate after cycles was evaluated, from among the above evaluative tests. Results are shown in Table 6.

TABLE 6

|  | 1-(trifluoromethoxy)-1,3-butadiene (wt %) | Capacity Retention Rate (%) |
| --- | --- | --- |
| Example 25 | 0.1 | 62 |
| Example 25 | 1 | 72 |
| Example 21 | 2 | 73 |
| Example 26 | 5 | 74 |
| Example 27 | 10 | 72 |
| Example 28 | 0.05 | 41 |
| Example 29 | 15 | 55 |

Table 6 shows that the appropriate amount of the compound represented by the general formula (4) to be added is 0.1 to 10 wt % relative to the non-aqueous electrolyte.

Examples 30 to 36

A non-aqueous electrolyte secondary battery was made in the same manner as Example 1, except that in the non-aqueous electrolyte, 1-(trifluoromethoxy)-1,3-butadiene was added as the above compound, and further, 5 mol % of an organic halide (the compound represented by the general formula (2)) as shown in Table 7 was added relative to 1-(trifluoromethoxy)-1,3-butadiene.

Herein, only the capacity retention rate after cycles was evaluated, from among the above evaluative tests. Results are shown in Table 7.

TABLE 7

|  | Organic Halide | Capacity Retention Rate (%) |
| --- | --- | --- |
| Example 30 | bromoethane | 84 |
| Example 31 | 1-bromopropane | 83 |
| Example 32 | 1-chlorobutane | 89 |
| Example 33 | 1-bromohexane | 82 |
| Example 34 | 1-bromo-1,1-dimethylethane | 63 |
| Example 35 | 1-chlorodecane | 61 |
| Example 36 | bromobenzene | 60 |

Table 7 shows that the capacity retention rate after 200 cycles improved in the system where the compound represented by the general formula (4) of the present invention was added, compared with the batteries of Examples 21 to 23 without the addition.

Figure 6:
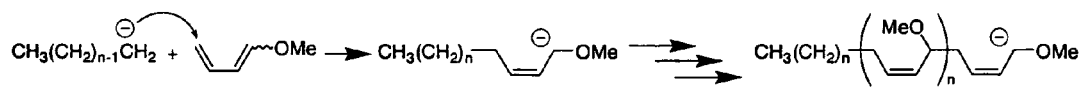
FIG. 6 shows a reaction in which a compound represented by the general formula (4) is polymerized with an alkyl lithium compound.

Reasons are probably the following: when the negative electrode was charged, the added halide was changed into an alkyl lithium compound (ref. FIG. 4), and further the compound became a polymerization initiator to polymerize 1-ethoxy-1,3-butadiene (ref. FIG. 6); as a result, the ratio of a geometrical isomer of cis structure relative to the polymer chain was increased, improving the "elasticity" of the coating for the negative electrode active material; and the coating worked effectively without being affected by the volume change of the negative electrode active material through charge and discharge cycle.

Examples 37 to 41

A non-aqueous electrolyte secondary battery was made in the same manner as Example 1, except that in the non-aqueous electrolyte, 2-(trifluoromethoxy)-1,3-butadiene was added as the above specific compound, and further, 1-chlorobutane as an organic halide (the compound represented by the general formula (2)) was added in the amount shown in Table 8 (0.05 to 15 mol %) relative to 2-(trifluoromethoxy)-1,3-butadiene.

Herein, only the capacity retention rate after cycles was evaluated, from among the above evaluative tests. Results are shown in Table 8.

TABLE 8

|  | Amount of 1-chlorobutane Added (mol %) | Capacity Retention Rate (%) |
| --- | --- | --- |
| Example 37 | 0.1 | 83 |
| Example 38 | 1 | 92 |
| Example 39 | 10 | 87 |
| Example 40 | 0.05 | 80 |
| Example 41 | 15 | 76 |

Table 8 shows that there is no significant difference from the case without addition as shown in Table 5 when the amount of 1-chlorobutane added was 0.05 mol %, and shows that battery characteristics slightly deteriorated when the amount added was 15 mol %. The above results show that the appropriate amount of the organic halide to be added is 0.1 to 10 mol % relative to the above compound.

Examples 42 and 43

A non-aqueous electrolyte secondary battery was made in the same manner as Examples 1 and 2, except that SnO was used instead of amorphous silicon oxide powder (SiO$_x$; x=1.02) used in Example 1 as the negative electrode active material. The theoretical capacity of the battery made was 2200 mAh. Herein, only the capacity retention rate after cycles was evaluated, from among the above evaluative tests. Results are shown in Table 9.

Comparative Example 5

A non-aqueous electrolyte secondary battery was made in the same manner as Example 42, except that in the non-aqueous electrolyte, the compound represented by the general formula (1) was not added. Herein, only the capacity retention rate after cycles was evaluated, from among the above evaluative tests. Results are shown in Table 9.

TABLE 9

|  | Added Compound | Capacity Retention Rate (%) |
| --- | --- | --- |
| Example 42 | 1,3-butadiene | 70 |
| Example 43 | isoprene | 76 |
| Comparative Example 5 | — | 22 |

Table 9 shows that the capacity retention rate after 200 cycles is greatly improved in the batteries of Examples 42 and 43, compared with that of Comparative Example 5. In other words, Table 9 shows that even when SnO was used as the negative electrode active material, the effects of the present invention are brought out.

Examples 44 and 45

A non-aqueous electrolyte secondary battery was made in the same manner as Examples 1 and 2, except that a flake graphite was used instead of the amorphous silicon oxide powder (SiO$_x$; x=1.02) used in Example 1 as the negative electrode active material. The theoretical capacity of the battery made was 2100 mAh. Herein, only the capacity retention rate after cycles was evaluated, from among the above evaluative tests. Results are shown in Table 10.

Comparative Example 6

A non-aqueous electrolyte secondary battery was made in the same manner as Example 44, except that in the non-aqueous electrolyte, the above compound was not added. Herein, only the capacity retention rate after cycles was evaluated, from among the above evaluative tests. Results are shown in, Table 10.

Comparative Examples 7 to 9

A non-aqueous electrolyte secondary battery was made in the same manner as Example 44, except that in the non-aqueous electrolyte, vinylene carbonate (VC), vinyl ethylene carbonate (VEC), or 1,5-cyclooctadiene was added instead of the above compound. Herein, only the capacity retention rate after cycles was evaluated, from among the above evaluative tests. The results are shown in Table 10.

TABLE 10

|  | Added Compound | Capacity Retention Rate (%) |
| --- | --- | --- |
| Example 44 | 1,3-butadiene | 93 |
| Example 45 | isoprene | 95 |
| Comparative Example 6 | — | 65 |
| Comparative Example 7 | vinylene carbonate | 78 |
| Comparative Example 8 | vinyl ethylene carbonate | 77 |
| Comparative Example 9 | 1,5-cyclooctadiene | 72 |

Table 10 shows that the capacity retention rate after 200 cycles is greatly improved in the batteries of Examples 44 and 45 compared with that of Comparative Examples 6 to 9. In other words, even when flake graphite was used as the negative electrode active material, the effects of the present invention are brought out.

The present invention enables a production of a stable coating, even when a negative electrode active material including Si and Sn as an element and having a high capacity but a high volume change through charge and discharge is used. Therefore, the present invention is highly applicable and effective as a technique for capacity increase for non-aqueous electrolyte secondary batteries.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A non-aqueous electrolyte secondary battery comprising:
   a positive electrode including a positive electrode active material for absorbing and desorbing lithium;
   a negative electrode including a negative electrode active material for absorbing and desorbing lithium;
   a separator interposed between said positive electrode and said negative electrode; and
   a non-aqueous electrolyte,
   wherein said non-aqueous electrolyte comprises isoprene and an organic halide represented by the general formula (2):

$X(CH_2)_nCH_3,$ where n is an integer from 1 to 5, and X is Cl, Br, or I.

2. The non-aqueous electrolyte secondary battery in accordance with claim 1, wherein said negative electrode active material is mainly composed of a compound including at least one of Si and Sn as an element.

3. The non-aqueous electrolyte secondary battery in accordance with claim 1, wherein said organic halide comprises 0.1 to 10 mol % of the non-aqueous electrolyte.

* * * * *